US006522515B1

(12) United States Patent
Whitney

(10) Patent No.: US 6,522,515 B1
(45) Date of Patent: Feb. 18, 2003

(54) DATA AND POWER CONNECTOR PORT

(75) Inventor: Stephen J. Whitney, Lake Zurich, IL (US)

(73) Assignee: Littelfuse, Inc., Des Plaines, IL (US)

( * ) Notice: Subject to any disclaimer, the term of this patent is extended or adjusted under 35 U.S.C. 154(b) by 0 days.

(21) Appl. No.: 09/478,575

(22) Filed: Jan. 6, 2000

Related U.S. Application Data

(60) Provisional application No. 60/115,141, filed on Jan. 8, 1999.

(51) Int. Cl.[7] ................................................ H02H 5/00

(52) U.S. Cl. ........................ 361/104; 361/56; 361/91.1; 361/93.1

(58) Field of Search .......................... 361/56, 91.1, 111, 361/93.1, 93.6, 93.8, 104, 79, 87, 78; 439/620, 621, 622; 713/340; 714/47, 43

(56) References Cited

U.S. PATENT DOCUMENTS

| | | | | |
|---|---|---|---|---|
| 3,936,700 A | | 2/1976 | Reiter | |
| 4,280,221 A | | 7/1981 | Chun et al. | |
| 4,413,300 A | | 11/1983 | Sumi et al. | |
| 5,647,767 A | | 7/1997 | Scheer et al. | |
| 5,675,813 A | * | 10/1997 | Holmdahl | 713/310 |
| 5,753,982 A | * | 5/1998 | Yeh | 307/139 |
| 6,000,042 A | * | 12/1999 | Henrie | 714/40 |

OTHER PUBLICATIONS

Micrel Product Brochure, entitled: "MIC2505/2506 Single 2A/Dual 1A/High–Side Switches". (No Date).

Unitrode Product Brochure, entitled: "UCC3912 Programmable Hot Swap Power Manager".(No Date).

* cited by examiner

*Primary Examiner*—Stephen W. Jackson
(74) *Attorney, Agent, or Firm*—Bell, Boyd & Lloyd LLC

(57) ABSTRACT

A connector port for providing power to a serial device and termination of differential signals received therefrom is provided. The port includes circuitry providing a data interface and a power interface. The data interface is operably connected between an input differential wire pair and an output differential wire pair for providing termination of the input wire pair and transmission of signal onto the output wire pair. Further, the power interface includes a fuse link operably connected between a voltage input and a voltage output for providing overcurrent protection.

20 Claims, 2 Drawing Sheets

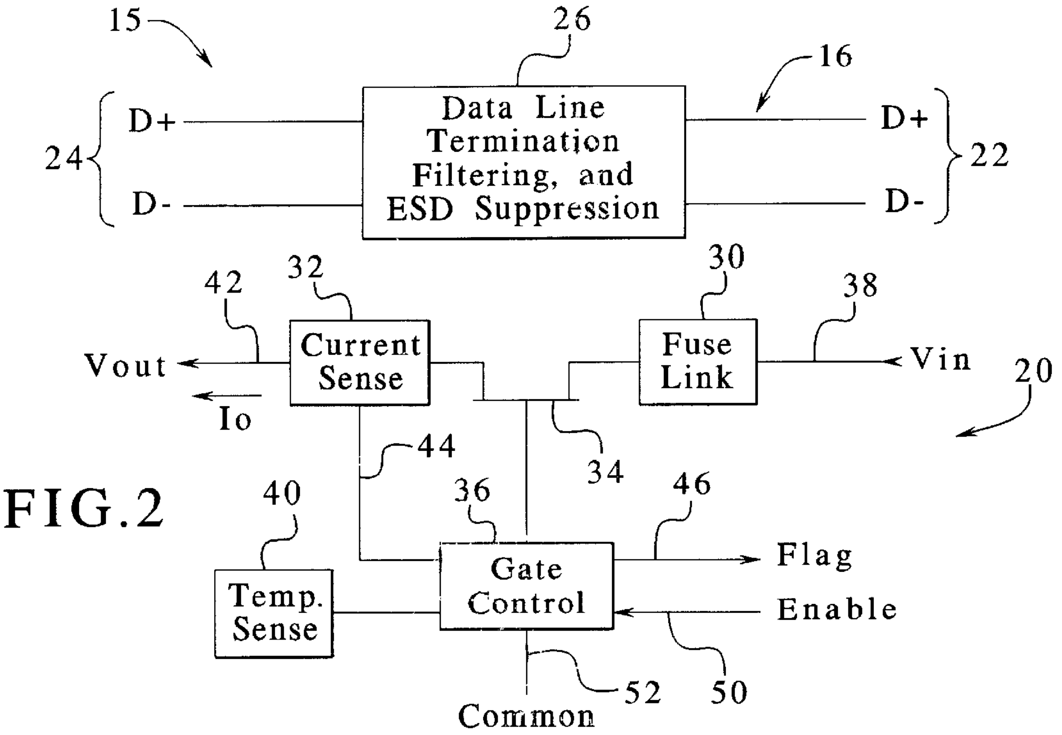
FIG.2
FIG.3
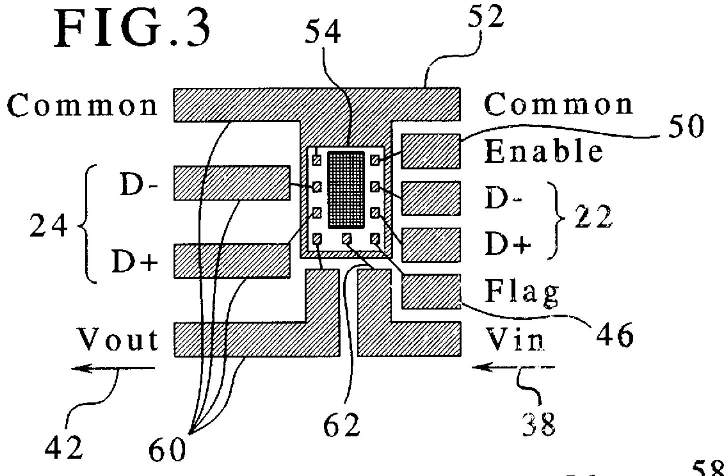
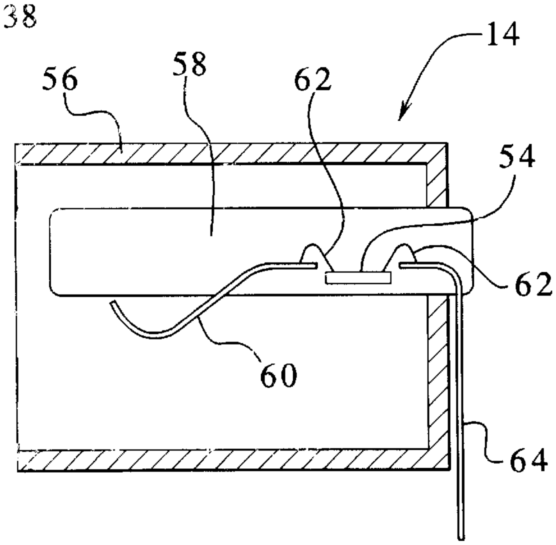
FIG.4

DATA AND POWER CONNECTOR PORT

This application claims the benefit of Provisional application No. 60/115,141, filed Jan. 8, 1999.

BACKGROUND OF THE INVENTION

The present invention generally relates to communication systems that receive differential signals from a serial host, and in particular to a circuit for providing power to the serial device and termination of differential signals received therefrom.

Buses are widely used to provide unidirectional or bidirectional communication between two or more electronic devices. For example, a bus may be utilized to connect a printer, a monitor, and a keyboard with a CPU (Computer Processing Unit).

In order to communicate between components, electrical signals are applied to the bus by a transmitting station and received by another station on the bus. For high speed serial communications, a "differential" type of signal transmission has been found particularly advantageous. A differential signal is transmitted over a pair of wires. Each wire transmits the same signal, but with different polarities. A differential signal provides a higher signal to noise ratio and better overall performance because, in part, timing distortions are minimized.

However, there is a need for a connector port that, along with terminating the differential signals, provides RFI filtering and electrostatic discharge protection for the bus. Moreover, because many types of serial devices require the connector port to supply power, there is a need to regulate the amount of power provided for preventing damage to various devices or wiring due to a fault that causes an inordinate amount of current to be drawn.

SUMMARY OF THE INVENTION

The present invention provides a connector port having a data interface circuit and a power interface circuit. The data interface is operably connected between an input differential wire pair and an output differential wire pair for providing termination of the input wire pair and transmission of signals onto the output wire pair. Further, the power interface includes a fuse link operably connected between a voltage input and a voltage output for providing overcurrent protection.

To this end, in an embodiment, a connector port for connecting to a serial device providing a differential wire pair input signal is provided. The port comprises a data interface circuit operably connected to the serial device for providing termination of the input signal and responsive differential output signals onto an output wire pair, and a power interface circuit having a voltage output operably connected to the serial device and a fuse link attached to the voltage output for providing overcurrent protection.

In an embodiment, the interface circuit further includes electrostatic discharge protection operably connected to the differential wire pair input signal.

In a further embodiment, the interface circuit further includes a filter operably connected to the differential wire pair signal.

In an embodiment, the power interface further includes a switch operably connected to the voltage output for substantially removing power from the serial device.

In a further embodiment, the power interface further includes a current sensor operably connected to the switch for detecting the amount of power received by the serial device.

In an embodiment, a connector jack is provided for containing the data interface circuit and the power interface circuit.

Additional advantages and features of the present invention will become apparent upon reading the following detailed description of the presently preferred embodiments and appended claims, and upon reference to the attached drawings.

BRIEF DESCRIPTION OF THE FIGURES

In the accompanying drawings that form part of the specification, and in which like numerals are employed to designate like parts throughout the same.

FIG. 2 is a simplified block diagram of a single connector port depicted in FIG. 1;

FIG. 3 is a top view of an embodiment of an integrated circuit die configured in accordance with the block diagram of FIG. 2; and FIG. 4 is a partial cross-sectional side view of a single connector port depicted in FIG. 1, and having an electrical contact support member with the die of FIG. 2 encapsulated therein.

DETAILED DESCRIPTION OF THE PRESENTLY PREFERRED EMBODIMENTS

Figure 1:
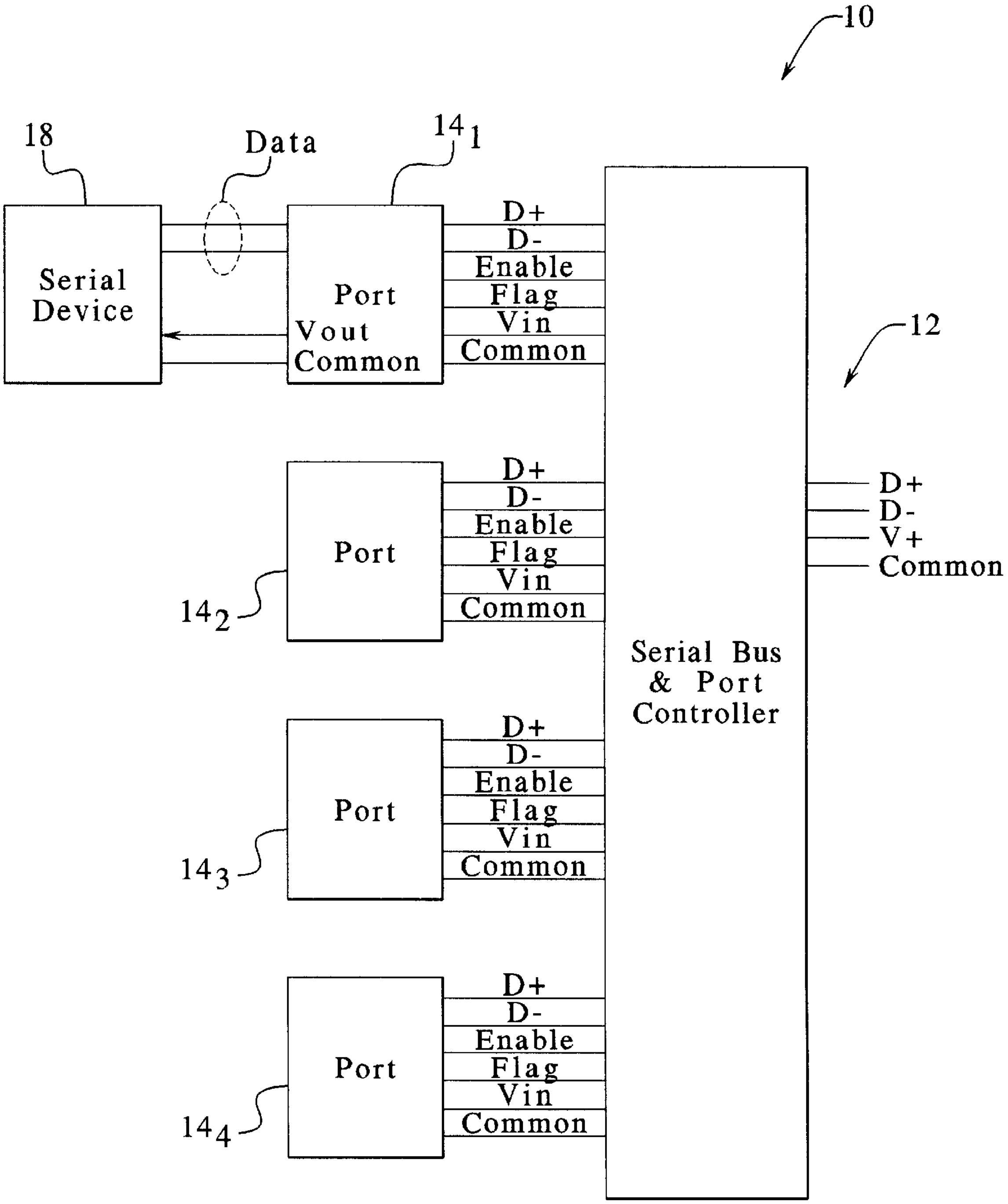
FIG. 1 is a simplified block diagram of a node for a serial bus having a plurality of connector ports in accordance with the present invention.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiments illustrated.

The present invention provides an apparatus for the termination of differential signals from a serial device and limiting the amount of power that can be drawn by the device. Turning to the figures, and particularly to FIG. 1, a simplified block diagram of a node 10 for a serial bus 12 is depicted having a plurality of connector ports $\mathbf{14}_{1\text{-}4}$ in accordance with the present invention. Each port 14 in the node 10 receives a differential signal from a respective serial device 18 (only one shown) and forwards a corresponding differential signal onto the bus 12.

As shown in FIG. 2, each port 14 includes a circuit 15 providing a data transmission line bridge or interface 16 and a power bridge or interface 20. The data interface 16 is operably connected between a differential wire pair data input 22 and a differential wire pair data output 24. The data interface 16 provides differential signals on output pair 24 in response to differential signals received at input pair 22.

In an embodiment, the data interface 16 includes a block 26 operably connected between input pair 22 and output pair 24. Preferably, block 26 includes circuitry for termination of input pair 22. Block 26 also can include protective elements or circuits for suppressing damaging voltage spikes from being transferred to the output pair 24 resulting from an electrostatic discharge at input pair 22 such as a 15 kV transient. Moreover, filtering circuitry can be provided within block 26 for improving the interpretation of data signals received at input pair 22.

The power interface 20 preferably includes a fuse link 30, a current sensor 32, a switching device 34, a switch controller 36, and a temperature sensor 40. The fuse link 30 provides for overcurrent protection and is operably connected to the switching device 34 and a voltage potential input 38 having a preferred operating range of about 3Vdc to about 8Vdc. The fuse link 30 can include, for example, a bonding wire 62 (FIGS. 3 and 4) or strip of fusible material that melts and interrupts the circuit when the current flowing through the link 30 exceeds a particular amperage. The bonding wire can consist of, for example, an electrically conductive lead coated with RTV, a ceramic adhesive, or a hot melt.

The current sensor 32 within the power interface 20 is operably connected to a voltage potential output 42, the switching device 34, and the switch controller 36. The current sensor 32 provides for the transmission of current between the switching device 34 and the voltage output 42. In addition, the current sensor 32 measures the amount of output current $I_o$ flowing from output 42 and, in response thereto, generates a current detection signal 44 corresponding to the amount of output current flow.

The switching device 34 of the power interface 20 is operably connected to the fuse link 30, the current sensor 32, and the switch controller 36. The switching device 34 can consist of, for example, a field-effect transistor having an "on" state and an "off" state for controlling the flow of current and the voltage potential between voltage input 38 and output 42. Preferably, when turned on, the switching device 34 is capable of allowing a maximum of about 1.5 Amps of output current $I_o$ to flow to output 42 from the current sensor 32, with a maximum voltage drop between input 38 and output 42 of about 50 mV. Moreover, when turned off, the switching device 34 is preferably capable of increasing the voltage drop between the fuse link 30 and the current sensor 32 such that the voltage potential at output 42 is less than about 0.1V when measured across a load resistance of 1kΩ.

The switch controller 36 is operably connected to the switching device 34, the current sensor 32, the temperature sensor 40, a flag output 46, an enable input 50, and a common ground 52. The switch controller 36 controls the state of the switching device 34 in response to signals received from the current sensor 32, temperature sensor 40, and enable input 50. Preferably, the switch controller 36 turns off the switching device 34 during an overcurrent condition. For example, in an embodiment, the switch controller 36 turns off the switching device 34 if, for more than about 10 msec, the current detection signal 44 received from the current sensor 32 indicates an output current exceeding about 1.5 Amps. It is desired that, for facilitating "soft" start-up of capacitively loaded circuits, the controller 36 not react to those occurrences wherein the output current exceeds about 1.5 Amps for less than about 10 msec.

The enable input 50 provides for enabling and disabling the switch controller 36. When enabled, the switch controller 36 responds to signals from the current sensor 32 and the temperature sensor 40 for determining whether to turn the switching device 34 either off or on.

Temperature sensor 40 indicates to the switch controller 36 when switch 34 is to be turned off because the operating temperature of the integrated circuit 15 has exceeded a preselected maximum operating temperature such as, for example, 125° C. Furthermore, flag output 50 indicates whether the switch controller 36 is presently turning on or off the switching device 34.

Turning to FIGS. 3 and 4, an embodiment of an integrated circuit die 54 is depicted in accordance with the block diagram of FIG. 2. As shown in FIG. 4, each port 14 includes a jack housing 56 with an attached electrically insulative contact support member 58 for containing or encapsulating the die 54, bond wires 62 and a portion of the contacts. Also attached to the support member 58 are a plurality of electrically conductive contacts fingers 60 (only one finger shown). Preferably, each port has four contact fingers 60 connected, via respective wire bonds 62, to data output pair 24, voltage output 42, and common 52. The contact fingers 60 provide for engagement of a plug connector having like electrical contacts for forming data and power transmission paths between the port 14 and an external transmitting device 18. The port 14 also includes solder contacts 64 (only one solder tab shown) that enable the die 54 to electrically couple to the serial bus and port controller 12.

It should be understood that various changes and modifications to the presently preferred embodiments described herein will be apparent to those skilled in the art. Such changes and modifications can be made without departing from the spirit and scope of the present invention and without diminishing its attended advantages. It is therefore intended that such changes and modifications be covered by the appended claims.

I claim:

1. A connector port for connecting to a serial device providing a differential wire pair input signal, the port comprising:

a data interface circuit operably connected to the serial device for providing termination of the input signal and responsive differential output signals onto an output wire pair;

a power interface circuit having a voltage output operably connected to the serial device and a fuse link attached to the voltage output for providing overcurrent protection, wherein the data interface circuit further includes electrostatic discharge protection operably connected to the differential wire pair input signal.

2. The connector port of claim 2, wherein the data interface circuit further includes a filter operably connected to the differential wire pair signal.

3. The connector port of claim 1, wherein the power interface further includes a switch operably connected to the voltage output for substantially removing power from the serial device.

4. The connector port of claim 3, wherein the power interface further includes a current sensor operably connected to the switch for detecting the amount of power received by the serial device.

5. The connector port of claim 4, wherein the power interface further includes a controller operably connected between the sensor and the switch for determining when to remove the power from the serial device.

6. The connector port of claim 1, further comprising a connector jack for containing the data interface circuit and the power interface circuit.

7. The connector port of claim 1, wherein the differential wire pair input signal is bidirectional.

8. An integrated circuit die housed inside a port for connecting to a serial device, the die comprising:

an integrated data interface circuit that electrically communicates with a pair of data transmission contacts disposed within the port; and an integrated power interface circuit that electrically communicates with a voltage output contact and a common contact disposed within the port, wherein the power interface circuit includes a fuse link coupled to a voltage input contact that is disposed within the port.

9. The integrated circuit die of claim 8, wherein the data interface circuit and the data transmission contacts are coupled via wire bonds.

10. The integrated circuit die of claim 8, wherein the power interface circuit and the voltage output contact are coupled via a wire bond.

11. The integrated circuit die of claim 8, wherein the power interface circuit includes a strip of material that melts at a particular amperage coupled to a voltage input contact attached to the port.

12. A power interface circuit for a port that connects to a serial device, the power interface circuit comprising:

a voltage output line that connects to the serial device;

a switch operably connected to the voltage output line that breaks electrical communication with the voltage output line;

a current sensor operably connected to the switch, the current sensor detecting an amount of current received by the serial device; and a controller operably connected between the switch and the current sensor, the controller controlling the switch in response to a communication received from the current sensor.

13. The power interface circuit of claim 12, which includes a temperature sensor that communicates with the controller, the controller controlling the switch in response to a communication received from the temperature sensor.

14. The power interface circuit of claim 12, which includes a flag output that communicates with the controller, the flag output indicating whether the controller is turning the switch on or off.

15. The integrated circuit die of claim 8, wherein the power interface circuit includes a switch electrically connected to the voltage output contact.

16. The integrated circuit die of claim 15, wherein the power interface circuit includes a temperature sensor operably coupled to the switch.

17. The integrated circuit die of claim 8, wherein the integrated data interface circuit is bidirectional.

18. The power interface circuit of claim 12, which includes a fuse link between a voltage input and the current sensor.

19. The power interface circuit of claim 12, wherein the fuse link includes a material that thermally deforms at a particular amperage.

20. The power interface circuit of claim 12, which is bidirectional.

* * * * *